(12) United States Patent
Shimoda

(10) Patent No.: US 10,023,030 B2
(45) Date of Patent: Jul. 17, 2018

(54) STRUCTURE OF VEHICLE SIDE DOOR

(71) Applicant: Toyota Jidosha Kabushiki Kaisha, Toyota-shi, Aichi-ken (JP)

(72) Inventor: Akihiko Shimoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/700,761

(22) Filed: Sep. 11, 2017

(65) Prior Publication Data

US 2018/0072141 A1 Mar. 15, 2018

(30) Foreign Application Priority Data

Sep. 13, 2016 (JP) .................................. 2016/178633

(51) Int. Cl.
*B60J 5/04* (2006.01)
*B60J 10/75* (2016.01)
*B62D 25/02* (2006.01)

(52) U.S. Cl.
CPC ........... *B60J 5/0413* (2013.01); *B60J 5/0411* (2013.01); *B60J 5/0426* (2013.01); *B60J 10/75* (2016.02); *B62D 25/02* (2013.01)

(58) Field of Classification Search
CPC ........ B60J 5/0413; B60J 10/75; B60J 5/0411; B60J 5/0426; B62D 25/02
USPC ..................................................... 296/146.6
See application file for complete search history.

(56) References Cited

U.S. PATENT DOCUMENTS

| 7,637,555 B2 * | 12/2009 | Kameoka | ............... B60J 5/0411 296/146.6 |
| 8,418,408 B2 * | 4/2013 | Yasuhara | ............... B60J 5/0444 296/146.6 |

FOREIGN PATENT DOCUMENTS

| JP | 05042825 A | 2/1993 |
| JP | 2000355219 A | 12/2000 |
| JP | 2007216788 A | 8/2007 |
| JP | 2013095204 A | 5/2013 |
| JP | 2013099979 A | 5/2013 |

* cited by examiner

*Primary Examiner* — Joseph Pape
(74) *Attorney, Agent, or Firm* — Dinsmore & Shohl LLP

(57) ABSTRACT

A structure of a vehicle side door includes: an inner panel including a first protrusion and a second protrusion alternately provided in a vehicle front-rear direction at an upper end of the inner pane, the first protrusion protruding to the inner side, the second protrusion protruding to an outer side; an inner reinforcement that has a flange and is provided along the vehicle front-rear direction, the flange including a joint and a cutout alternately provided in the vehicle front-rear direction, the joint being joined to a surface of the first protrusion on the outer side, the cutout exposing the second protrusion from the flange to the outer side; and a weatherstrip provided along the vehicle front-rear direction, the weatherstrip including a pinching part that contacts a surface of the first protrusion on the inner side and a surface of the second protrusion on the outer side.

6 Claims, 5 Drawing Sheets structure of vehicle side door

CROSS-REFERENCE TO RELATED APPLICATIONS

This application claims priority to Japanese Patent Application No. 2016-178633 filed on Sep. 13, 2016, which is incorporated herein by reference in its entirety including the specification, drawings and abstract.

BACKGROUND

1. Technical Field

The present disclosure relates to a structure of a vehicle side door.

2. Description of Related Art

A vehicle side door has an outer panel that is disposed on an outer side in a vehicle width direction and an inner panel that is disposed on an inner side in the vehicle width direction. In some cases, an inner reinforcement that is a reinforcing member extending along a vehicle front-rear direction is provided in an upper part of the inner panel, and an upper end of such an inner reinforcement is joined to an upper end of the inner panel (see Japanese Patent Application Publication No. 5-42825).

A publicly known weatherstrip disclosed in Japanese Patent Application Publication No. 2000-355219 etc. is installed at the upper end of the inner panel. The weatherstrip is provided with a pinching part that pinches the upper end of the inner panel, and the weatherstrip is installed on the inner panel through this pinching part.

SUMMARY

Even among vehicles of the same model (vehicles with the same name and different specifications), the vehicle weight varies when the specifications of the motor, the drive system, etc. installed vary. A heavier vehicle has a larger amount of kinetic energy than a lighter vehicle of the same model at the same speed, and thus has different requirements for the side doors in terms of vehicle crash performance from those of the lighter vehicle.

For a lighter vehicle among vehicles of the same model, the inner panel of the side door is designed so that the vehicle crash performance can be secured without the inner reinforcement. For a heavier vehicle among vehicles of the same model, by contrast, the vehicle crash performance is sometimes secured by providing the inner panel with the inner reinforcement to cope with an increase in kinetic energy. Thus, even among vehicles of the same model, some vehicles may be provided with the inner reinforcement for the inner panel of the side door, while the inner reinforcement may be omitted in other vehicles.

Here, in the case where the inner reinforcement is provided for the inner panel, the upper end of the inner reinforcement is joined to the upper end of the inner panel as described above. As a result, the width (thickness) in the vehicle width direction of a pinched part pinched by the pinching part of the weatherstrip in the upper end of the inner panel provided with the inner reinforcement becomes larger than the width of the same pinched part in the upper end of the inner panel not provided with the inner reinforcement by the plate thickness of the upper end of the inner reinforcement.

Thus, the structure of the pinching part of the weatherstrip or the upper end of the inner panel need be differentiated between a side door in which the inner panel is provided with the inner reinforcement and a side door in which the inner panel is not provided with the inner reinforcement according to the difference in width of the pinched part. Accordingly, the inner panel and the weatherstrip of a side door equipped with the inner reinforcement cannot be used as the inner panel and the weatherstrip of a side door not equipped with the inner reinforcement.

The present disclosure provides a structure of a vehicle side door that allows the inner panel and the weatherstrip of a side door equipped with an inner reinforcement to be used as the inner panel and the weatherstrip of a side door not equipped with an inner reinforcement.

According to an aspect of the present disclosure, there is provided a structure of a vehicle side door. The structure of a vehicle side door according to the aspect of the disclosure includes: an inner panel disposed on an inner side of the side door in a vehicle width direction of a vehicle, the inner panel including a first protrusion and a second protrusion, the first protrusion and the second protrusion being provided at an upper end of the inner panel in a vehicle upper-lower direction, the first protrusion protruding to the inner side in the vehicle width direction, the second protrusion protruding to an outer side in the vehicle width direction as seen from the first protrusion, the first protrusion and the second protrusion being alternately provided in a vehicle front-rear direction; an inner reinforcement that has a flange fixed to the upper end of the inner panel and is provided along the vehicle front-rear direction, the flange including a joint and a cutout, the joint being joined to a surface of the first protrusion on the outer side in the vehicle width direction, the cutout exposing the second protrusion from the flange to the outer side in the vehicle width direction, the joint and the cutout being alternately provided in the vehicle front-rear direction; and a weatherstrip provided at the upper end of the inner panel along the vehicle front-rear direction, the weatherstrip including a pinching part holding the inner panel by pinching the inner panel in the vehicle width direction in such a manner that the pinching part contacts a surface of the first protrusion on the inner side in the vehicle width direction and a surface of the second protrusion on the outer side in the vehicle width direction.

According to this configuration, the surface located on the inner side in the vehicle width direction of the first protrusion formed at the upper end of the inner panel and the surface located on the outer side in the vehicle width direction of the second protrusion formed at the upper end of the inner panel are pinched by the pinching part of the weatherstrip. Here, the inner reinforcement is provided with the flange that is fixed to the upper end of the inner panel, and the joint joined to the surface of the first protrusion on the outer side in the vehicle width direction is formed in this flange. The joint is joined to the surface of the first protrusion on the opposite side from the surface (the surface on the inner side in the vehicle width direction) of the first protrusion that is pinched by the pinching part of the weatherstrip. Moreover, the cutout that exposes the second protrusion from the flange to the outer side in the vehicle width direction is also formed in the flange. Thus, the flange is accommodated between the surface of the first protrusion on the inner side in the vehicle width direction and the surface of the second protrusion on the outer side in the vehicle width direction. Accordingly, when the width in the vehicle width direction of the part pinched by the pinching part of the weatherstrip in the upper end of the inner panel is referred to as a pinched width, providing the inner panel with the inner reinforcement does not cause an increase in this pinched width by the plate thickness of the flange of the inner reinforcement. In other words, the pinched width in the case where the inner panel is provided with the inner reinforcement and the pinched width in the case where the inner panel is not provided with the inner reinforcement are the same.

It is therefore possible to use the inner panel and the weatherstrip of a side door equipped with an inner reinforcement as the inner panel and the weatherstrip of a side door not equipped with an inner reinforcement. Thus, common inner panel and weatherstrip can be used for a side door equipped with an inner reinforcement and a side door not equipped with an inner reinforcement.

In the above aspect, the flange may include a third protrusion that is adjacent to the joint, protrudes to the outer side in the vehicle width direction relative to the joint, and has the cutout.

In this configuration, the third protrusion protruding to the outer side in the vehicle width direction relative to the joint is provided in the flange, and thereby a bent portion is formed in the flange, which enhances the rigidity of the flange. It is therefore possible to enhance the rigidity of the flange while exposing the second protrusion to the outer side in the vehicle width direction through the cutout of the third protrusion provided adjacent to the joint.

In the above aspect, the structure of the vehicle side door may include an outer panel facing an outside of the vehicle, and the inner panel may be disposed on the inner side in the vehicle width direction relative to the outer panel.

In the above aspect, in a cross-sectional view perpendicular to the vehicle upper-lower direction, the first protrusion may have a trapezoidal shape protruding to the inner side in the vehicle width direction relative to the second protrusion; and in the cross-sectional view perpendicular to the vehicle upper-lower direction, the second protrusion may have a trapezoidal shape protruding to the outer side in the vehicle width direction relative to the first protrusion.

In the above aspect, an amount of protrusion of the third protrusion from the joint to the outer side in the vehicle width direction may be smaller than an amount of protrusion of the second protrusion from the surface of the first protrusion on the outer side in the vehicle width direction.

In the above aspect, the pinching part may hold the upper end of the inner panel by pressing the surface of the first protrusion on the inner side in the vehicle width direction from the inner side in the vehicle width direction and pressing the surface of the second protrusion on the outer side in the vehicle width direction from the outer side in the vehicle width direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a structure of a vehicle side door will be described below with reference to FIG. 1 to FIG. 5. In these drawings, a vehicle front side, vehicle rear side, vehicle upper side, and vehicle lower side are indicated by an arrow FR, arrow RR, arrow UP, and arrow DN, respectively. A direction toward a vehicle inner side in a vehicle width direction and a direction toward a vehicle outer side in the vehicle width direction are indicated by an arrow IN and an arrow OUT, respectively.

Figure 1:
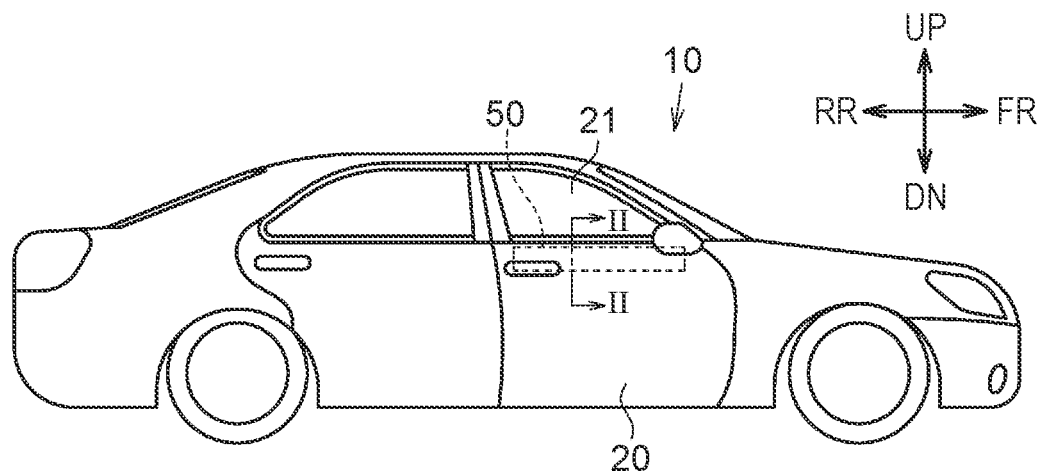
FIG. 1 is a side view of a vehicle to which a structure of a vehicle side door of an embodiment is applied.

As shown in FIG. 1, a front side door 20 (hereinafter referred to as a side door 20) that opens and closes a door opening which is provided on a front seat side of the vehicle 10 and through which an occupant gets in and out of the vehicle 10 is provided on a lateral side of the vehicle 10. A rear side door that opens and closes a door opening which is provided on a rear seat side of the vehicle 10 and through which an occupant gets in and out of the vehicle 10 is also provided on the lateral side of the vehicle 10.

The side door 20 is provided with a side door glass 21 that moves up and down in a vehicle upper-lower direction. An inner reinforcement 50 as a reinforcing member extending along a vehicle front-rear direction is provided inside the side door 20 in a door beltline of the vehicle 10.

Figure 2:
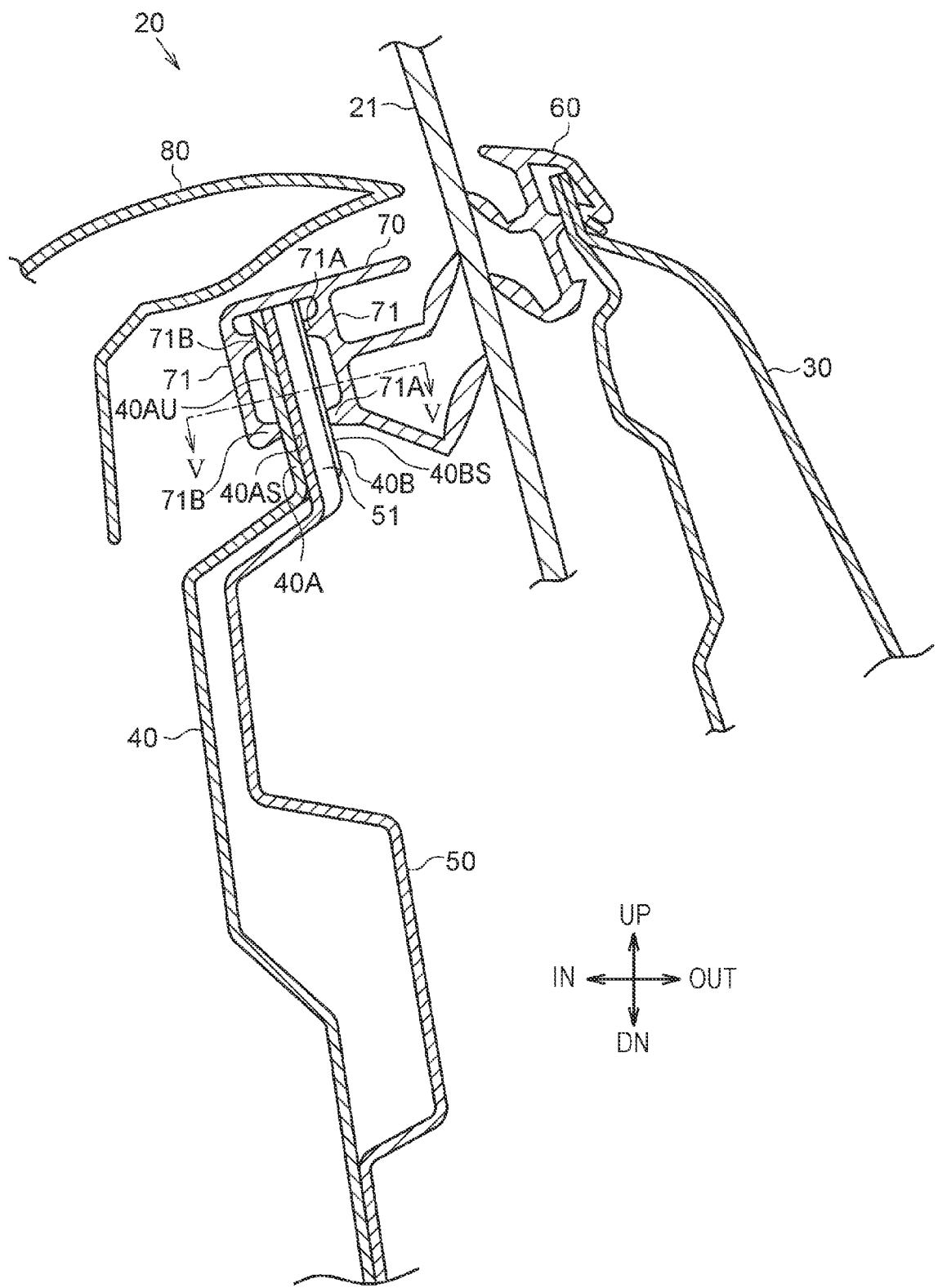
FIG. 2 is a sectional view of a side door taken along the line II-II indicated in FIG. 1.

As shown in FIG. 2, the side door 20 includes an inner panel 40 that is disposed on the inner side in the vehicle width direction and an outer panel 30 that is disposed on the outer side of the inner panel 40 in the vehicle width direction. A peripheral edge of the inner panel 40 and a peripheral edge of the outer panel 30 are joined together by hemming except for upper edges between which the side door glass 21 moves in and out.

The outer panel 30 is formed by pressing a steel sheet material, and a weatherstrip 60 extending along the vehicle front-rear direction is installed at an upper end of the outer panel 30.

The inner panel 40 is also formed by pressing a steel sheet material. A door trim 80 etc. as an interior decoration material is mounted on the inner side of the inner panel 40 in the vehicle width direction.

Figure 3:
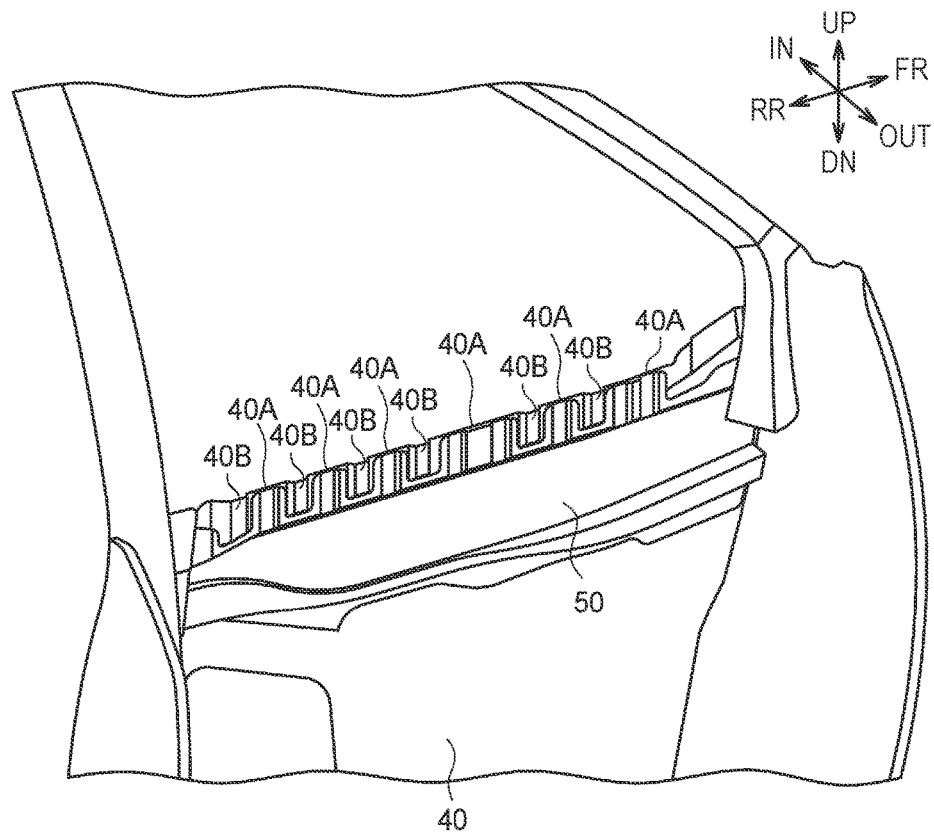
FIG. 3 is a perspective view of an inner panel to which a beltline reinforcement is fixed in the embodiment, as seen from an outer side in a vehicle width direction.
Figure 5:
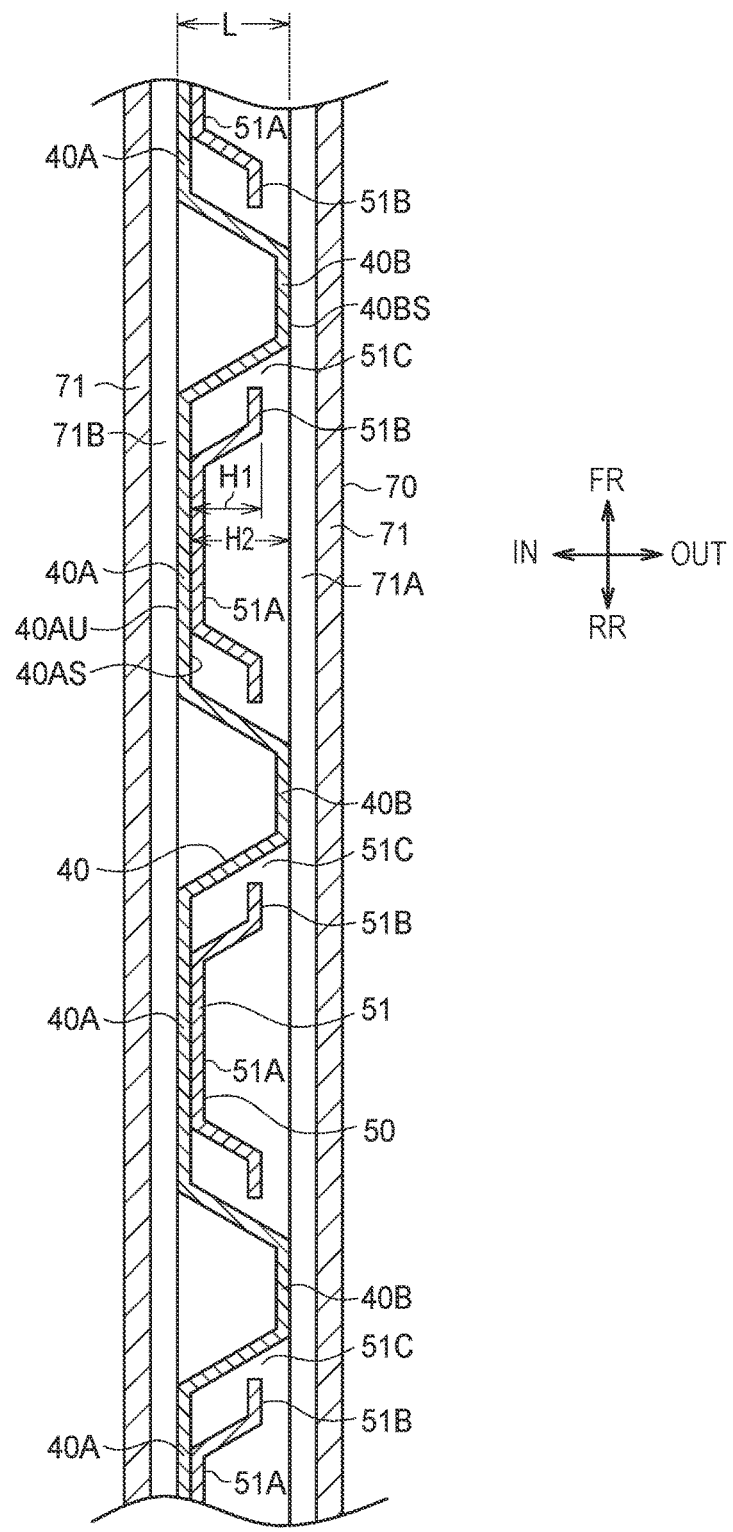
FIG. 5 is a sectional view of the side door taken along the line V-V indicated in FIG. 2.

As shown in FIG. 2, FIG. 3, and FIG. 5, first protrusions 40A protruding to the inner side in the vehicle width direction and second protrusions 40B protruding to the outer side in the vehicle width direction as seen from the first protrusions 40A are alternately formed in the vehicle front-rear direction at the upper end of the inner panel 40. As shown in FIG. 5, a cross-section of the first protrusion 40A in a plane parallel to the vehicle front-rear direction and the vehicle width direction has a trapezoidal shape protruding to the inner side in the vehicle width direction. Similarly, a cross-section of the second protrusion 40B in a plane parallel to the vehicle front-rear direction and the vehicle width direction has a trapezoidal shape protruding to the outer side in the vehicle width direction.

As shown in FIG. 2, the inner reinforcement 50 is provided in an upper part of the inner panel 40, on the outer side in the vehicle width direction. The inner reinforcement 50 is provided with a flange 51 that is fixed to the upper end of the inner panel 40.

Figure 4:
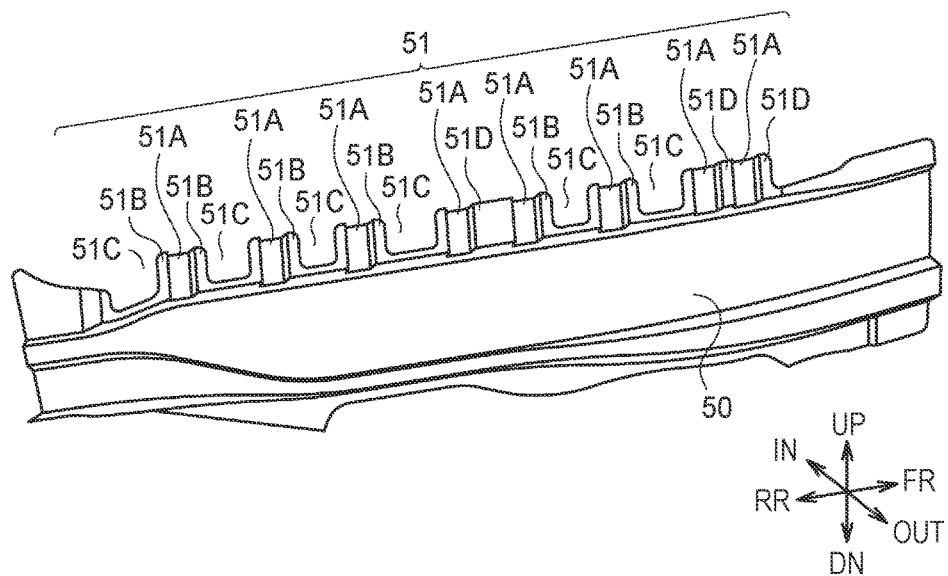
FIG. 4 is a perspective view of the beltline reinforcement of the embodiment.

As shown in FIG. 4, the inner reinforcement 50 is formed in an elongated shape by pressing a steel sheet material. As shown in FIG. 4 and FIG. 5, in the flange 51 provided on an upper part of the inner reinforcement 50, joints 51A that are each joined to a surface 40AS of the first protrusion 40A on the outer side in the vehicle width direction and cutouts 51C that each expose the second protrusion 40B from the flange 51 to the outer side in the vehicle width direction are alternately formed in the vehicle front-rear direction. The surface 40AS of the first protrusion 40A on the outer side in the vehicle width direction and the joint 51A are joined together by spot welding in this embodiment, but the surface 40AS and the joint 51A may be joined together by other methods.

Moreover, third protrusions 51B that are provided adjacent to the joints 51A and formed so as to protrude to the outer side in the vehicle width direction relative to the joints 51A and that each have the cutout 51C are also formed in the flange 51. As with the second protrusion 40B, a cross-section of the third protrusion 51B in a plane parallel to the vehicle front-rear direction and the vehicle width direction has a trapezoidal shape protruding to the outer side in the vehicle width direction. As shown in FIG. 5, an amount of protrusion H1 of the third protrusion 51B from the surface 40AS of the first protrusion 40A on the outer side in the vehicle width direction is set to be smaller than an amount of protrusion 112 of the second protrusion 40B from the surface 40AS of the first protrusion 40A on the outer side in the vehicle width direction, so that the second protrusion 40B is exposed through the cutout 51C of the third protrusion 51B to the outer side in the vehicle width direction.

Moreover, fourth protrusions 51D that are provided adjacent to the joints 51A and formed so as to protrude to the outer side in the vehicle width direction relative to the joints 51A and that do not have the cutout 51C are also formed in the flange 51. The fourth protrusion 51D is formed at a portion of the flange 51 that faces a portion of the upper end of the inner panel 40 at which the second protrusion 40B is not formed. As with the cross-section of the third protrusion 51B, a cross-section of the fourth protrusion 51D also has a trapezoidal shape. An amount of protrusion of the fourth protrusion 51D from the surface 40AS of the first protrusion 40A on the outer side in the vehicle width direction is the same as the amount of protrusion H1 of the third protrusion 51B. However, it is not absolutely necessary to set the amount of protrusion of the fourth protrusion 51D to the same amount as the amount of protrusion H1 of the third protrusion 51B, and the amount of protrusion of the fourth protrusion 51D can be set to any amount that is smaller than the amount of protrusion H2 of the second protrusion 40B from the surface 40AS of the first protrusion 40A on the outer side in the vehicle width direction. In other words, the amount of protrusion of the fourth protrusion 51D can be set so that the fourth protrusion 51D does not protrude farther to the outer side in the vehicle width direction than the second protrusion 40B.

As shown in FIG. 2 referred to earlier, a weatherstrip 70 extending along the vehicle front-rear direction is installed at the upper end of the inner panel 40. The weatherstrip 70 includes a pinching part 71 that extends along the vehicle front-rear direction and pinches the upper end of the inner panel 40. A pair of projections 71A, 71B pinching the upper end of the inner panel 40 are formed in the pinching part 71 so as to extend along the vehicle front-rear direction.

More specifically, as shown in FIG. 2 and FIG. 5 referred to earlier, the projection 71A of the pinching part 71 butts against a surface 40BS on the outer side in the vehicle width direction of the second protrusion 40B of the inner panel 40 so as to press the surface 40BS. The projection 71B of the pinching part 71 butts against a surface 40AU on the inner side in the vehicle width direction of the first protrusion 40A of the inner panel 40 so as to press the surface 40AU. Thus, the upper end of the inner panel 40 is pinched by the pinching part 71.

The side door glass 21 is mounted between the weatherstrip 60 provided on the outer panel 30 and the weatherstrip 70 provided on the inner panel 40.

The embodiment having been described above can produce the following effects of (1) to (3):

(1) As shown in FIG. 2 and FIG. 5, the surfaces 40AU located on the inner side in the vehicle width direction of the first protrusions 40A formed at the upper end of the inner panel 40 and the surfaces 40BS located on the outer side in the vehicle width direction of the second protrusions 40B formed at the upper end of the inner panel 40 are pinched by the pinching part 71 of the weatherstrip 70.

Here, the inner reinforcement 50 is provided with the flange 51 that is fixed to the upper end of the inner panel 40, and the joins 51A joined to the surfaces 40AS of the first protrusions 40A on the outer side in the vehicle width direction are formed in the flange 51 as shown in FIG. 5. The joint 51A is joined to the surface of the first protrusion 40A (the surface 40AS of the first protrusion 40A on the outer side in the vehicle width direction) on the opposite side from the surface of the first protrusion 40A (the surface 40AU of the first protrusion 40A on the inner side in the vehicle width direction) that is pinched by the pinching part 71 of the weatherstrip 70. Moreover, the cutouts 51C that expose the second protrusions 40B from the flange 51 to the outer side in the vehicle width direction are also formed in the flange 51. Thus, the flange 51 is accommodated between the surfaces 40AU of the first protrusions 40A on the inner side in the vehicle width direction and the surfaces 40BS of the second protrusions 40B on the outer side in the vehicle width direction. Accordingly, when the width in the vehicle width direction of the part of the upper end of the inner panel 40 that is pinched between the pair of projections 71A, 71B provided in the pinching part 71 of the weatherstrip 70 is a pinched width L, providing the inner panel 40 with the inner reinforcement 50 does not cause an increase in the pinched width L by the plate thickness of the flange 51 of the inner reinforcement 50. In other words, the pinched width L in the case where the inner panel 40 is provided with the inner reinforcement 50 and the pinched width L in the case where the inner panel 40 is not provided with the inner reinforcement 50 are the same.

It is therefore possible to use the inner panel 40 and the weatherstrip 70 of the side door 20 equipped with the inner reinforcement 50 as the inner panel and the weatherstrip of the side door 20 not equipped with the inner reinforcement 50. Thus, the common inner panel 40 and weatherstrip 70 can be used for the side door 20 equipped with the inner reinforcement 50 and the side door 20 not equipped with the inner reinforcement 50.

(2) The third protrusions 51B that are provided adjacent to the joints 51A and formed so as to protrude to the outer side in the vehicle width direction relative to the joints 51A and that each have the cutout 51C are formed in the flange 51. Thus, the third protrusions 51B protruding to the outer side in the vehicle width direction relative to the joints 51A are formed in the flange 51, and thereby bent portions are formed in the flange 51, which enhances the rigidity of the flange 51. It is therefore possible to enhance the rigidity of the flange 51 while exposing the second protrusions 40B to the outer side in the vehicle width direction through the cutouts 51C of the third protrusions 51B provided adjacent to the joints 51A.

(3) The fourth protrusions 51D that are provided adjacent to the joints 51A and formed so as to protrude to the outer side in the vehicle width direction relative to the joints 51A and that do not have the cutout 51C are formed in the flange 51. Thus, the fourth protrusions 51D protruding to the outer side in the vehicle width direction relative to the joints 51A are formed in the flange 51, and thereby bent portions are formed in the flange 51, which enhances the rigidity of the flange 51.

The above embodiment can also be implemented with the following modifications made thereto. —The fourth protrusions 51D formed in the flange 51 may be replaced with the third protrusions 51B.

The upper end of the inner panel 40 is pinched by the pair of projections 71A, 71B provided in the pinching part 71 in the above embodiment, but the upper end of the inner panel 40 may be pinched by portions having a shape other than the shape of such a projection (e.g., flat plates).

Figure 6:
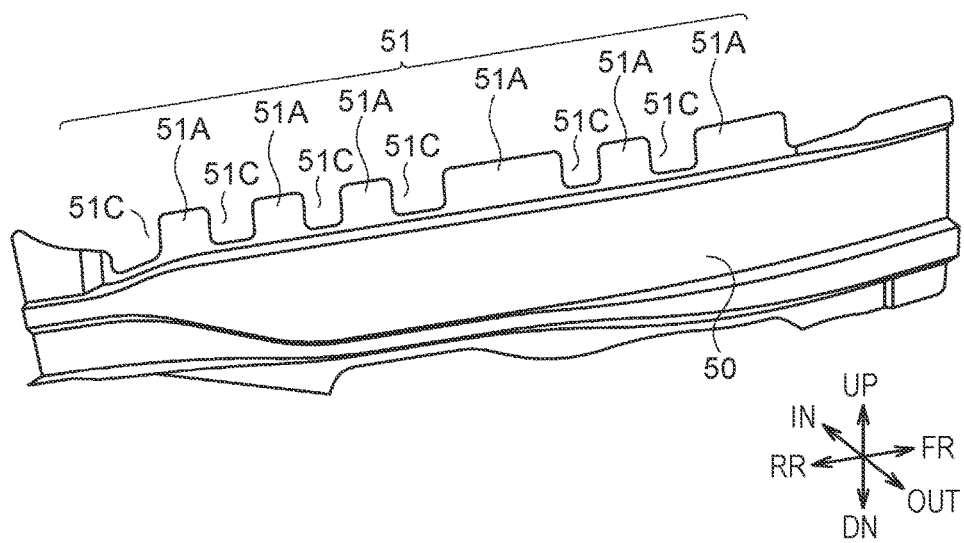
FIG. 6 is a perspective view of a beltline reinforcement in a modified example of the embodiment.

The cross-sections of the first protrusions 40A, the second protrusions 40B, and the third protrusions 51B have trapezoidal shapes in the above embodiment, but these cross-sections may have other shapes. —As shown in FIG. 6, the flange 51 of the inner reinforcement 50 may be formed in a flat plate shape. Then, the joints 51A and the cutouts 51C may be formed in the flat plate-shaped flange 51 alternately in the vehicle front-rear direction. Thus, the third protrusions 51B and the fourth protrusions 51D may be omitted from the flange 51 of the above embodiment. Also in this case, the effect described in (1) can be produced.

The structure of a side door described in the above embodiment is also applicable to a rear side door of a vehicle.

What is claimed is:

1. A structure of a side door of a vehicle, the structure comprising:
   an inner panel that forms an inner side of the side door in a vehicle width direction of the vehicle, the inner panel including a first protrusion and a second protrusion, the first protrusion and the second protrusion being provided at an upper end of the inner panel in a vehicle upper-lower direction, the first protrusion protruding inwardly with respect to the vehicle width direction, the second protrusion protruding outwardly with respect to the vehicle width direction relative to the first protrusion, the first protrusion and the second protrusion being provided in a vehicle front-rear direction;
   an inner reinforcement that has a flange fixed to the upper end of the inner panel and is provided along the vehicle front-rear direction, the flange including a joint and a cutout, the joint being joined to a surface of the first protrusion on an outer side of the side door in the vehicle width direction, the second protrusion protruding farther outward than the flange to the outer side in the vehicle width direction, the joint and the cutout being provided in the vehicle front-rear direction; and
   a weatherstrip provided at the upper end of the inner panel along the vehicle front-rear direction, the weatherstrip including a pinching part holding the inner panel by pinching the inner panel in the vehicle width direction in such a manner that the pinching part contacts a surface of the first protrusion on the inner side in the vehicle width direction and a surface of the second protrusion on the outer side of the side door in the vehicle width direction.

2. The structure of the side door according to claim 1, wherein
   the flange includes a third protrusion that is adjacent to the joint, protrudes to the outer side of the side door in the vehicle width direction relative to the joint, and the third protrusion includes the cutout.

3. The structure of the vehicle side door according to claim 1, further comprising
   an outer panel facing an outside of the vehicle, wherein
   the inner panel is disposed on the inner side of the side door in the vehicle width direction relative to the outer panel.

4. The structure of the side door according to claim 1, wherein:
   in a cross-sectional view perpendicular to the vehicle upper-lower direction, the first protrusion and the pinching part define a trapezoidal shape protruding to the inner side of the side door in the vehicle width direction relative to the second protrusion; and
   in the cross-sectional view perpendicular to the vehicle upper-lower direction, the second protrusion and the pinching part define a trapezoidal shape protruding to the outer side of the side door in the vehicle width direction relative to the first protrusion.

5. The structure of the side door according to claim 2, wherein
   an amount of protrusion of the third protrusion from the joint to the outer side of the side door in the vehicle width direction is smaller than an amount of protrusion of the second protrusion from the surface of the first protrusion on the outer side of the side door in the vehicle width direction.

6. The structure of the side door according to claim 1, wherein
   the pinching part holds the upper end of the inner panel by pressing the surface of the first protrusion on the inner side of the side door in the vehicle width direction from the inner side of the side door in the vehicle width direction and pressing the surface of the second protrusion on the outer side of the side door in the vehicle width direction from the outer side of the side door in the vehicle width direction.

* * * * *

UNITED STATES PATENT AND TRADEMARK OFFICE
CERTIFICATE OF CORRECTION

PATENT NO.        : 10,023,030 B2
APPLICATION NO.   : 15/700761
DATED             : July 17, 2018
INVENTOR(S)       : Akihiko Shimoda It is certified that error appears in the above-identified patent and that said Letters Patent is hereby corrected as shown below:

In the Claims

In Column 8, Claim 3, Line 20, before "side door", delete "vehicle".

Signed and Sealed this
Twenty-fifth Day of September, 2018

Andrei Iancu
*Director of the United States Patent and Trademark Office*